US011280219B2

(12) United States Patent
Puranik et al.

(10) Patent No.: US 11,280,219 B2
(45) Date of Patent: Mar. 22, 2022

(54) ROTOR SUPPORT STRUCTURES FOR ROTATING DRUM ROTORS OF GAS TURBINE ENGINES

(71) Applicant: General Electric Company, Schenectady, NY (US)

(72) Inventors: Shashank Suresh Puranik, Bangalore (IN); Bhaskar Nanda Mondal, Bangalore (IN); Richard Schmidt, Loveland, OH (US); Peeyush Pankaj, Bangalore (IN); Narayanan Payyoor, Bangalore (IN)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 16/697,350

(22) Filed: Nov. 27, 2019

(65) Prior Publication Data

US 2021/0156279 A1    May 27, 2021

(51) Int. Cl.
F01D 25/16 (2006.01)
F01D 5/03 (2006.01)
(Continued)

(52) U.S. Cl.
CPC ............. *F01D 25/162* (2013.01); *F01D 5/03* (2013.01); *F01D 5/06* (2013.01); *F04D 29/059* (2013.01);
(Continued)

(58) Field of Classification Search
CPC ...... F01D 25/16; F01D 25/162; F01D 25/164; F01D 5/03; F01D 5/06; F02C 3/067; F16C 13/006; F16C 13/04
See application file for complete search history.

(56) References Cited

U.S. PATENT DOCUMENTS 2,028,603 A * 1/1936 John ................. F01D 5/03
                                                    415/100
2,269,700 A * 1/1942 Treshow ............. F27B 7/22
                                                    248/130
(Continued)

FOREIGN PATENT DOCUMENTS

CA       2841592 A1    10/2014
CA       2861292 A1     6/2015
(Continued)

OTHER PUBLICATIONS

U.S. Appl. No. 16/394,180, filed Apr. 25, 2019.
(Continued)

*Primary Examiner* — Courtney D Heinle
*Assistant Examiner* — Topaz L. Elliott
(74) *Attorney, Agent, or Firm* — Dority & Manning, P.A.

(57) ABSTRACT

A rotor support system for a gas turbine engine includes a rotatable drum rotor and a non-rotatable support casing. The rotor support system includes a bearing assembly configured for positioning between the rotatable drum rotor and the non-rotatable support casing. The bearing assembly includes, at least, a stationary support frame and a rotatable race. Further, the rotatable race is configured to engage the rotatable drum rotor at separate and discrete locations that are circumferentially spaced apart around the rotatable drum rotor.

14 Claims, 5 Drawing Sheets

(51) Int. Cl.
  *F04D 29/059* (2006.01)
  *F01D 5/06* (2006.01)
  *F16C 13/04* (2006.01)
  *F16C 13/00* (2006.01)

(52) U.S. Cl.
  CPC ........ *F05D 2240/54* (2013.01); *F16C 13/006* (2013.01); *F16C 13/04* (2013.01)

(56) References Cited

U.S. PATENT DOCUMENTS

| | | | |
|---|---|---|---|
| 2,445,661 A | 7/1948 | Constant | |
| 2,509,442 A * | 5/1950 | Matheisel | F01D 5/03 415/91 |
| 3,015,524 A * | 1/1962 | Slayter | F01D 25/162 384/117 |
| 3,295,801 A * | 1/1967 | McDowall | F16C 27/063 248/610 |
| 3,416,723 A | 12/1968 | Schmitz et al. | |
| 3,436,062 A * | 4/1969 | Vladimirovich | F27B 7/22 248/130 |
| 3,705,775 A | 12/1972 | Rioux | |
| 4,451,110 A | 5/1984 | Forestier | |
| 4,496,252 A | 1/1985 | Horler | |
| 5,074,109 A | 12/1991 | Mandet et al. | |
| 5,088,840 A | 2/1992 | Radtke | |
| 5,272,868 A | 12/1993 | Ciokajlo et al. | |
| 5,320,134 A | 6/1994 | Singh | |
| 5,752,774 A * | 5/1998 | Heshmat | F16C 32/0442 384/549 |
| 5,974,782 A | 11/1999 | Gerez | |
| 6,009,701 A | 1/2000 | Freeman et al. | |
| 6,082,959 A | 7/2000 | Van Duyn | |
| 6,099,165 A | 8/2000 | Tremaine | |
| 6,109,022 A | 8/2000 | Allen et al. | |
| 6,240,719 B1 | 6/2001 | Vondrell et al. | |
| 6,325,546 B1 | 12/2001 | Storace | |
| 6,491,497 B1 | 12/2002 | Allmon et al. | |
| 6,494,032 B2 | 12/2002 | Udall | |
| 6,783,319 B2 | 8/2004 | Doerflein | |
| 6,796,408 B2 | 9/2004 | Sherwin et al. | |
| 6,799,416 B2 | 10/2004 | Plona | |
| 7,004,047 B2 | 2/2006 | Rey et al. | |
| 7,097,413 B2 | 8/2006 | VanDuyn | |
| 7,195,444 B2 | 3/2007 | Brault et al. | |
| 7,404,678 B2 | 7/2008 | Plona | |
| 7,448,808 B2 | 11/2008 | Bouchy | |
| 7,669,799 B2 | 3/2010 | Elzey | |
| 7,749,341 B2 | 7/2010 | Noebe et al. | |
| 7,832,193 B2 | 11/2010 | Orlando | |
| 7,926,259 B2 | 4/2011 | Orlando | |
| 8,100,638 B2 | 1/2012 | Udall | |
| 8,128,339 B2 | 3/2012 | Kondo | |
| 8,136,999 B2 | 3/2012 | Mons et al. | |
| 8,167,531 B2 | 5/2012 | Mollmann et al. | |
| 8,246,255 B2 | 8/2012 | Raberin et al. | |
| 8,267,650 B2 | 9/2012 | Alam et al. | |
| 8,291,710 B2 | 10/2012 | Webster | |
| 8,371,802 B2 | 2/2013 | Udall | |
| 8,403,634 B2 | 3/2013 | Arness et al. | |
| 8,409,691 B1 | 4/2013 | Henry et al. | |
| 8,430,622 B2 | 4/2013 | Webster et al. | |
| 8,434,293 B2 | 5/2013 | Widdle, Jr. et al. | |
| 8,662,756 B2 | 3/2014 | Care et al. | |
| 8,726,652 B1 | 5/2014 | Gunter | |
| 8,834,095 B2 | 9/2014 | Davis | |
| 8,945,325 B2 | 2/2015 | Everhart et al. | |
| 8,986,146 B2 | 3/2015 | Gallet | |
| 9,051,877 B2 | 6/2015 | Sabnis | |
| 9,140,137 B2 | 9/2015 | Mayer et al. | |
| 9,353,754 B2 | 5/2016 | Gehlot et al. | |
| 9,482,384 B2 * | 11/2016 | Stuble | F16M 11/04 |
| 9,534,608 B2 | 1/2017 | Gehlot et al. | |
| 10,274,017 B2 | 4/2019 | Ganiger et al. | |
| 10,746,047 B2 * | 8/2020 | Wesling | F16C 32/0442 384/549 |
| 2002/0159882 A1 * | 10/2002 | Crall | F01D 5/16 415/119 |
| 2005/0222683 A1 | 10/2005 | Berry | |
| 2006/0093466 A1 * | 5/2006 | Seda | F01D 25/16 415/68 |
| 2006/0169857 A1 | 8/2006 | Hawkins et al. | |
| 2006/0269357 A1 | 11/2006 | Webb | |
| 2007/0157597 A1 | 7/2007 | Sharp | |
| 2008/0181763 A1 | 7/2008 | Webster et al. | |
| 2009/0148274 A1 | 6/2009 | Kostka et al. | |
| 2009/0185768 A1 | 7/2009 | Mons et al. | |
| 2010/0083632 A1 * | 4/2010 | Foster | B64D 27/16 60/39.181 |
| 2010/0310374 A1 | 12/2010 | Dehlsen | |
| 2011/0150378 A1 | 6/2011 | Care et al. | |
| 2012/0056005 A1 | 3/2012 | Webster | |
| 2012/0134838 A1 | 5/2012 | Jimenez et al. | |
| 2013/0324343 A1 | 12/2013 | Gallet | |
| 2014/0369830 A1 | 12/2014 | Fletcher et al. | |
| 2015/0144256 A1 | 5/2015 | Fabre et al. | |
| 2016/0229519 A1 | 8/2016 | Dilligan et al. | |
| 2016/0298539 A1 * | 10/2016 | Roberge | F02C 3/107 |
| 2017/0234157 A1 | 8/2017 | Khan et al. | |
| 2018/0112554 A1 | 4/2018 | Ghosh et al. | |
| 2018/0112672 A1 | 4/2018 | Ganiger et al. | |
| 2018/0135596 A1 | 5/2018 | Herrig et al. | |
| 2018/0298822 A1 | 10/2018 | AC et al. | |
| 2019/0128137 A1 * | 5/2019 | Wesling | F16C 27/063 248/610 |
| 2019/0128329 A1 | 5/2019 | Ghosh et al. | |
| 2019/0178104 A1 | 6/2019 | Joshi et al. | |

FOREIGN PATENT DOCUMENTS

| | | | |
|---|---|---|---|
| DE | 10259909 A1 * | 7/2004 | ............ F16C 27/066 |
| DE | 102005021446 B3 * | 6/2006 | ............ B29C 43/22 |
| EP | 1130243 A2 | 9/2001 | |
| EP | 1344896 A1 | 9/2003 | |
| EP | 2339131 A1 | 6/2011 | |
| EP | 3115551 A1 | 1/2017 | |
| FR | 1391619 A * | 3/1965 | ............ B29C 43/22 |
| FR | 2888621 A1 | 1/2007 | |
| FR | 2938874 A1 | 11/2008 | |
| GB | 2444935 A | 6/2008 | |
| JP | H06-200933 A | 7/1994 | |
| WO | WO2009/095758 A2 | 8/2009 | |
| WO | WO2010/001716 A1 | 1/2010 | |

OTHER PUBLICATIONS

Canadian Office Action Corresponding to Application CA3000360 dated Jan. 8, 2019.
ISR and Written Opinion Corresponding to PCT/US2017/033910 dated Aug. 17, 2017.
India Examination Report IN201641022484 dated Apr. 30, 2018.
Barbarino et al., A Review on Shape Memory Alloys With Applications Morphing Aircraft, Smart Materials and Structures, vol. 23, Issue 6, Apr. 2014, pp. 1-19.
Stebner, Development, Characterization, and Application of Ni19.5Ti50.5Pd25Pt5 High-Temperature Shape Memory Alloy Helical Actuators, Masters of Science Thesis University of Akron, Dec. 2007, pp. 1-110.
Wischt et al., Variable Stiffness Technique for Turbomachinery using Shape Memory Alloys, American Institute of Aeronautics and Astronautics SciTech Forum, 56$^{th}$ AIAA/ASCE/AHS/ASC Structures, Structural Dynamics, and Materials Conference, Jan. 5-9, 2015, pp. 1-13.
SMB Bearings, Full Ceramic Bearing Selection Guide, 1 Page. https://www.smbbearings.com/firebrick/ckeditor/plugins/upload/Uploads/Ceramic_Bearing_Selection_Guide.pdf.

* cited by examiner

ROTOR SUPPORT STRUCTURES FOR ROTATING DRUM ROTORS OF GAS TURBINE ENGINES

FIELD

The present disclosure relates generally to gas turbine engines and, more particularly, to rotor support structures for rotatable drum rotors of gas turbine engines.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a low pressure compressor (LPC) and a high pressure compressor (HPC). The LPC and the HPC may include one or more axially spaced apart stages. Each stage may include a row of circumferentially spaced apart stator vanes and a row of circumferentially spaced apart rotor blades positioned downstream of the row of stator vanes. The stator vanes direct the air flowing through the compressor section onto the rotor blades, which impart kinetic energy into the air to increase the pressure thereof.

The pressurized air exiting the HPC may then flow to a combustor within which fuel is injected into the flow of pressurized air, with the resulting mixture being combusted within the combustor. The high energy combustion products are directed from the combustor along the hot gas path of the engine to a high pressure turbine (HPT) for driving the HPC via a high pressure drive shaft, and then to a low pressure turbine (LPT) for driving the LPC. After driving each of LPT and HPT, the combustion products may be expelled via an exhaust nozzle to provide propulsive jet thrust.

The various rotating drum rotors throughout the sections of the gas turbine engine (e.g. in the HPC and LPT) may experience high deflection at their free ends during the bending mode or gyroscopic loading conditions. Accordingly, an improved rotor support system at the free end of such rotating drum rotors would be welcomed in the technology.

BRIEF DESCRIPTION

Aspects and advantages of the invention will be set forth in part in the following description, or may be obvious from the description, or may be learned through practice of the invention.

In one aspect, the present disclosure is directed to a gas turbine engine. The gas turbine engine includes a rotatable drum rotor having a plurality of blades secured thereto. The blades extend radially inward to the rotatable drum rotor. The gas turbine engine also includes a non-rotatable support casing mounted radially adjacent to the rotatable drum rotor and a rotor support system having a bearing assembly positioned between the rotatable drum rotor and the non-rotatable support casing. The bearing assembly includes, at least, a stationary support frame and a rotatable race. Further, the rotatable race engages the rotatable drum rotor at separate and discrete locations that are circumferentially spaced apart around the rotatable drum rotor.

In another aspect, the present disclosure is directed to a rotor support system for a gas turbine engine. The rotor support system includes a bearing assembly configured for positioning between a rotatable drum rotor and a non-rotatable support casing of the gas turbine engine. The bearing assembly includes, at least, a stationary support frame and a rotatable race. Further, the rotatable race is configured to engage the rotatable drum rotor at separate and discrete locations that are circumferentially spaced apart around the rotatable drum rotor.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Rotating drums may experience high deflection at the free end of the cantilever during the bending mode or gyroscopic loading conditions (maneuvers). As such, the present disclosure is directed to a discrete bearing arrangement positioned radially adjacent to the rotating drum, such that the rotating drum is in contact with the outer race of the bearing, the inner race of the bearing is held stationary, and the carrier arm is connected to various inner races of the bearings at one end, while the other end is connected to the casing (which is also static). In certain instances, oil-less bearings (e.g. ceramic bearings) can be used for high speed and/or high temperature application. In such bearings, the bearings may be submerged in a sump filled with a viscous fluid or may be operated in a grease pack.

Figure 1:
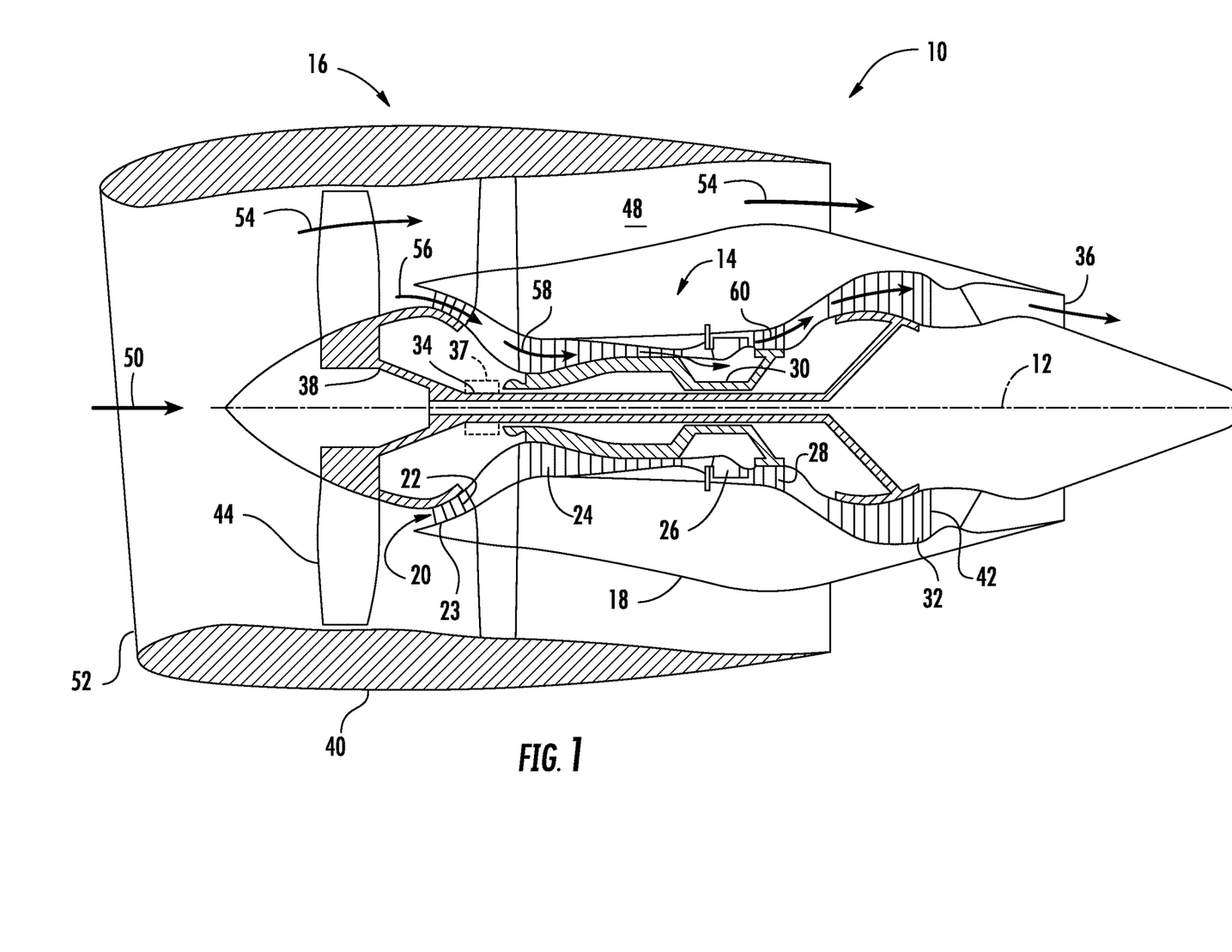
FIG. 1 illustrates a cross-sectional view of one embodiment of a gas turbine engine that may be utilized within an aircraft according to the present disclosure.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a low pressure, booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
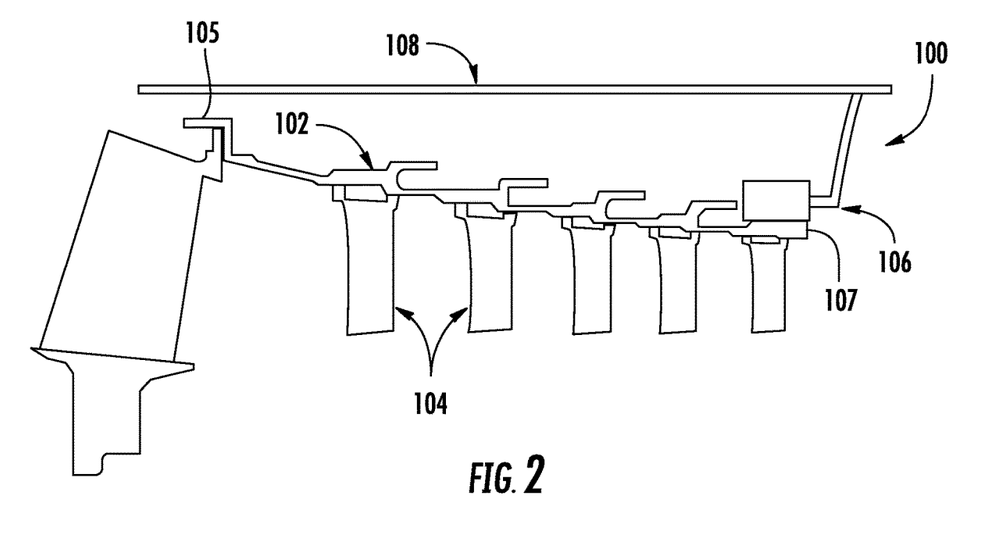
FIG. 2 illustrates a partial, cross-sectional view of one embodiment of a section of a gas turbine engine, particularly illustrating a rotor support system positioned between a rotatable drum rotor and a support casing according to the present disclosure.

Referring now to FIG. 2, a cross-sectional view of one embodiment of a rotor support system 100 suitable for use within a gas turbine engine 10 is illustrated in accordance with aspects of the present subject matter, particularly illustrating the rotor support system 100 installed relative to one of the high pressure compressor 24 or the low pressure turbine 32 of the gas turbine engine 10. Thus, it should be understood that the rotor support system 100 may be part of a compressor section, a turbine section, or a combustion section of the gas turbine engine 10. As shown in FIG. 2, the rotor support system 100 may generally include a rotatable drum rotor 102 configured to support a plurality of blades 104 extending radially inward therefrom. Further, as shown, the rotatable drum rotor 102 has a forward end 105 and an aft end 107.

Figure 3:
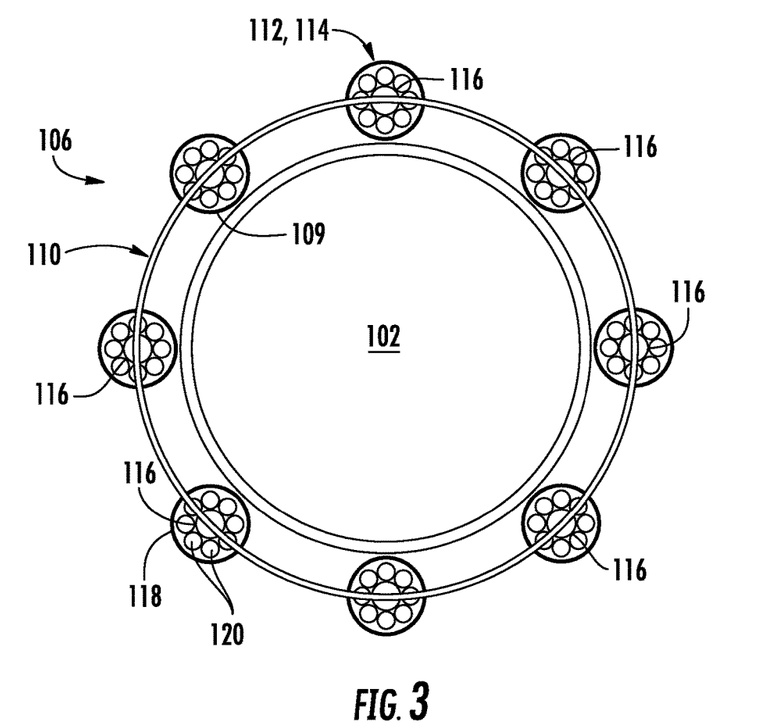
FIG. 3 illustrates a front view of one embodiment of a bearing assembly of the rotor support system according to the present disclosure.

Still referring to FIGS. 2 and 3, the rotatable drum rotor 102 may be supported within the engine 10 through the rotor support system 100, e.g. via one or more bearing assemblies 106. In such embodiments, each bearing assembly 106 may be configured to rotationally support the rotatable drum rotor 102 relative to a structural, non-rotating support casing 108 of the gas turbine engine 10 mounted radially outward of the rotatable drum rotor 102. For instance, as shown in FIG. 2, the bearing assembly 106 may be positioned between the rotatable drum rotor 102 and the support casing 108 of the rotor support system 100. Thus, in an embodiment, as shown, the bearing assembly 106 may be positioned at the aft end 107 of the rotatable drum rotor 102, which may be generally cantilevered. In another embodiment, the bearing assembly 106 may be positioned at any one or more axial locations along the rotatable drum rotor 102.

Figure 4:
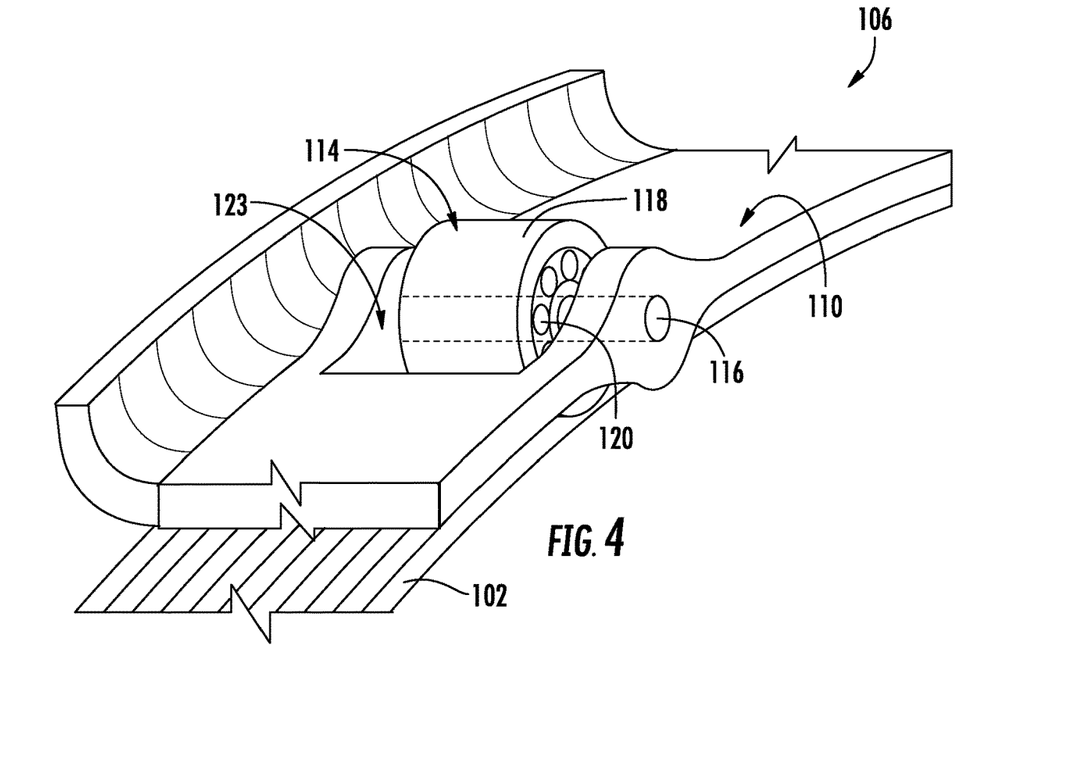
FIG. 4 illustrates a partial, perspective view of one embodiment of the bearing assembly of the rotor support system according to the present disclosure.
Figure 5:
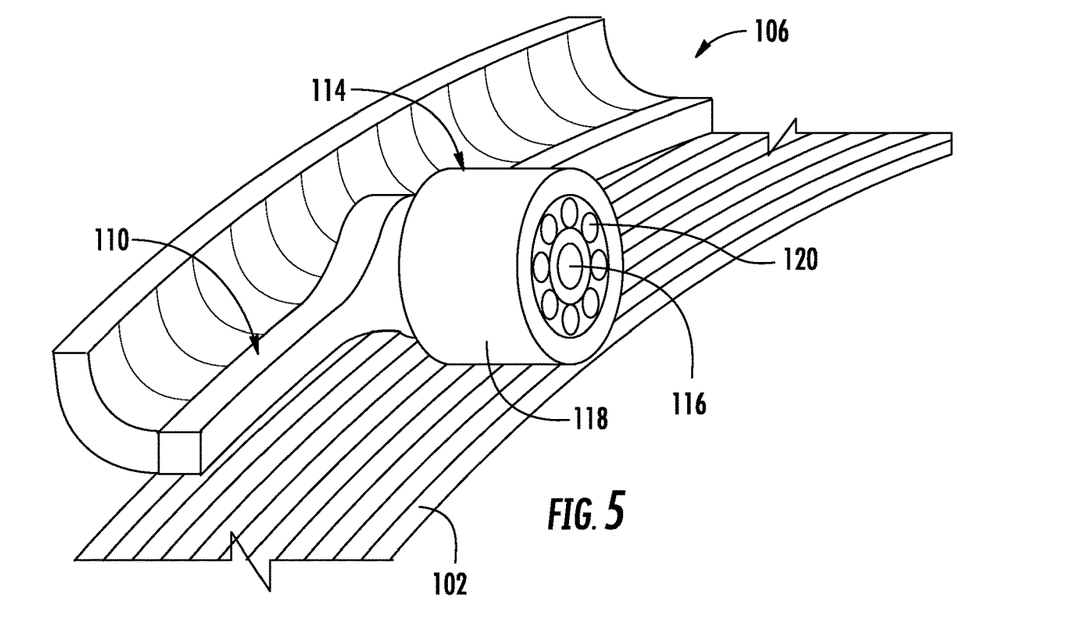
FIG. 5 illustrates a partial, perspective view of another embodiment of the bearing assembly of the rotor support system according to the present disclosure.

Referring to FIGS. 3-5, in several embodiments, the bearing assembly 106 may include, at least, a stationary support frame 110 and an overall rotatable race 112. More specifically, as shown, the stationary support frame 110 may correspond to an inner race of the bearing assembly 106, whereas the rotatable race 112 may correspond to an outer race of the bearing assembly 106. Further, as shown in FIGS. 3-5, the rotatable outer race 112 may engage the rotatable drum rotor 102 at separate and discrete locations 109 (FIG. 3) that are circumferentially spaced apart around the rotatable drum rotor 102. For example, as shown, in such embodiments, the rotatable race 112 may be defined by a plurality of rotatable roller bearings 114 circumferentially spaced apart about the rotatable rotor drum 102.

In additional embodiments, as shown in FIGS. 3-5, each of the plurality of roller bearings 114 may include a stationary inner race 116 or support shaft, an outer race 118 rotatable with respect to the inner race 116, and a plurality of rolling elements 120 arranged between the inner and outer races 116, 118. In such embodiments, as shown particularly in FIG. 3, the stationary support frame 110 may extend circumferentially around the rotatable drum rotor 102 and may connect to each of the inner races 116 of each of the roller bearings 114. Thus, in several embodiments, as shown in FIGS. 3-5, the inner races 116 of each of the roller bearings 114 may be fixed to the stationary support frame 110 such that the inner races 116 do not rotate with the rotatable drum rotor 102. In addition, in certain embodiments, the stiffness of the stationary support frame 110 may be optimized to achieve favorable flexibility that can maintain full contact between the rotatable race 112 and the rotatable drum rotor 102 during the complete thermal operating environment.

In particular embodiments, the rolling elements 120 described herein may generally correspond to any suitable rolling elements, such as ball rollers or cylindrical rollers. In addition, in further embodiments, the rolling elements 120 may be constructed, at least in part, of ceramic. Thus, in an embodiment, as shown, the outer races 118 of the roller bearings 114 may define the overall rotatable race 112 of the overall bearing assembly 106 that rotates with the rotatable drum rotor 102.

Referring particularly to FIG. 4, each of the roller bearings 114 may be secured within a cavity 123 of the stationary support frame 110. In such embodiments, each of the stationary inner races 116 or support shafts of the individual roller bearings 114 can be secured to opposing sides of the cavity 123 within the stationary support frame 110. In an alternative embodiment, as shown in FIG. 5, the stationary support frame 110 may be a simple ring with each of the stationary inner races 116 or support shafts being secured to the stationary support frame 110 at one end thereof (e.g. similar to a cantilever beam).

Figure 6:
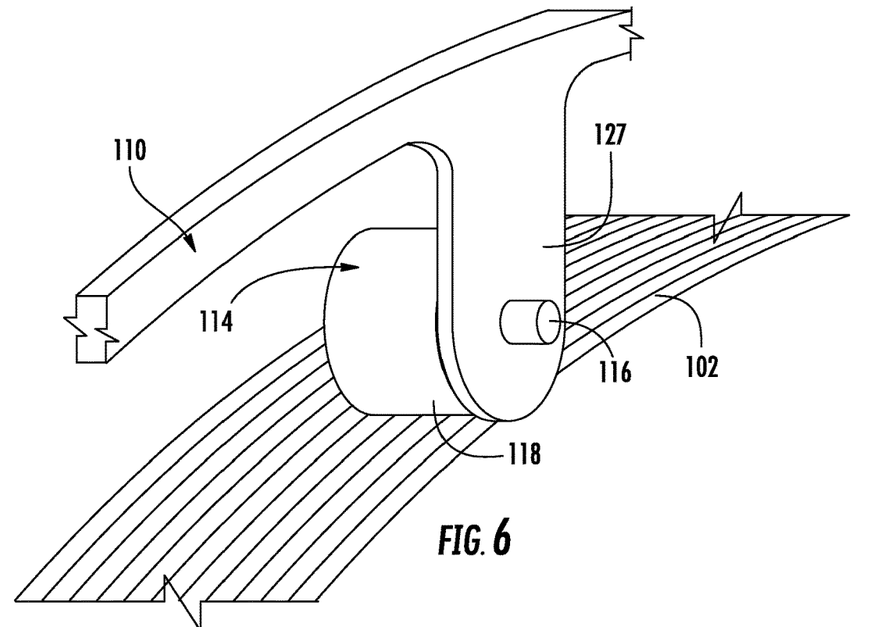
FIG. 6 illustrates a partial, perspective view of yet another embodiment of the bearing assembly of the rotor support system according to the present disclosure.

Referring now to FIG. 6, a partial, perspective view of another embodiment of the stationary support frame 110 is illustrated. As shown, rather than having an annular configuration as illustrated in FIGS. 3-5, the stationary support frame 110 may include one or more stationary arm members 127 mounted or otherwise secured to the non-rotatable support casing 108 and may extend from the inner races 116. Further, as shown, the roller bearings are supported on one side (e.g. via a cantilever support). In further, embodiments, the roller bearings may also be held on both sides (e.g. via straddled support).

Figure 7:
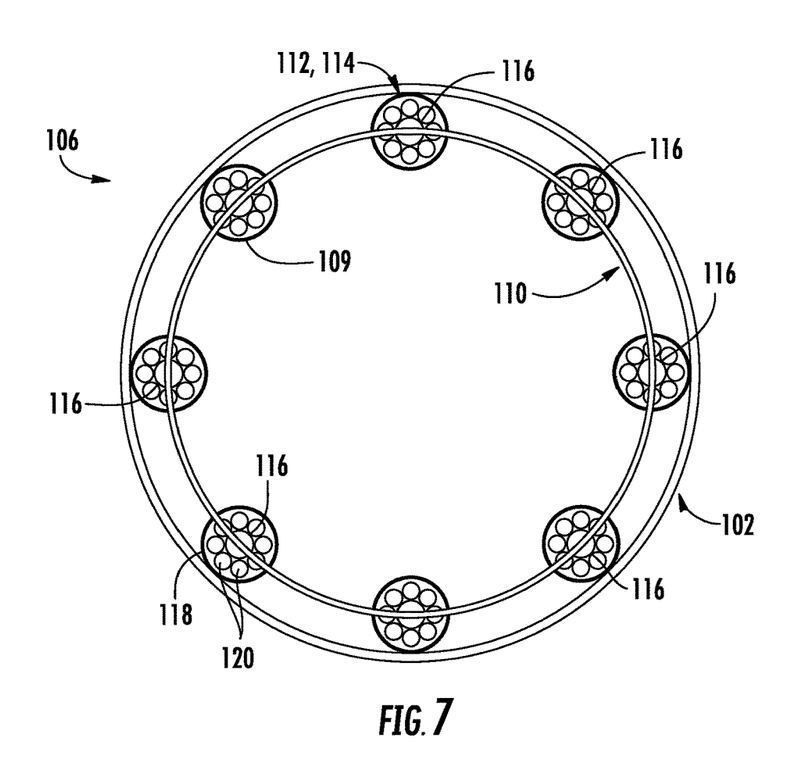
FIG. 7 illustrates a front view of one embodiment of the bearing assembly of the rotor support system according to the present disclosure.
Figure 8:
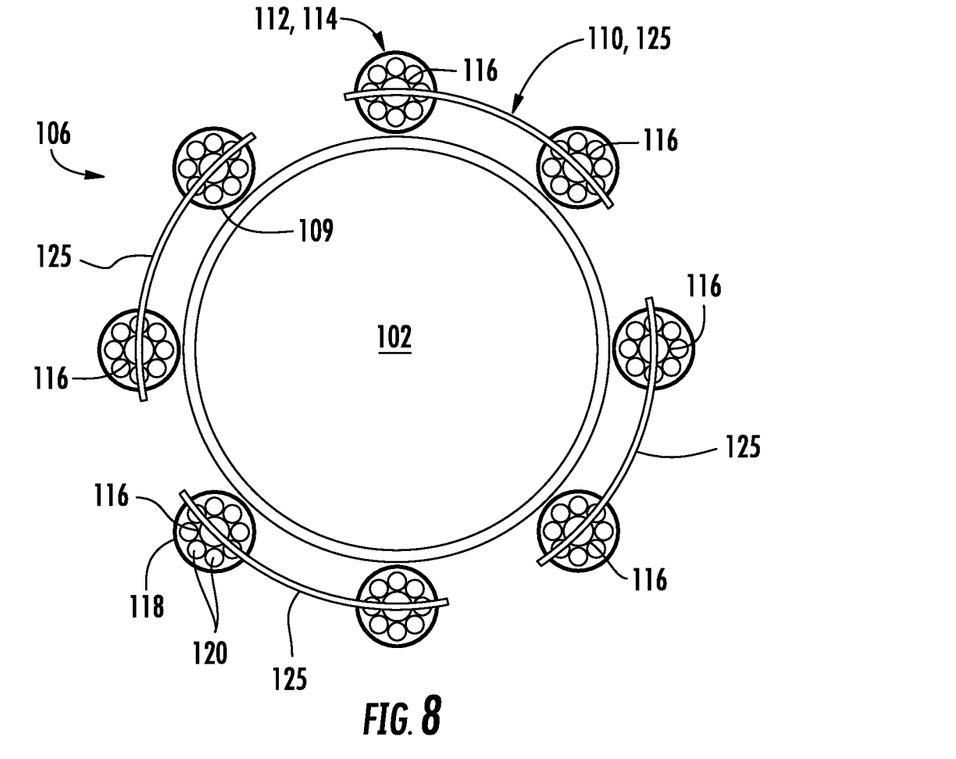
FIG. 8 illustrates a front view of another embodiment of the bearing assembly of the rotor support system according to the present disclosure.

Referring now to FIGS. 7 and 8, still additional embodiments of the bearing assembly 106 of the present disclosure are illustrated. For example, as shown in FIG. 7, the bearing assembly 106 may include the stationary support frame 110 internal to the rotatable drum rotor 102. Moreover, as shown in FIG. 8, the stationary support frame 110 may be constructed of a plurality of segments 125.

Various aspects and embodiments of the present invention are defined by the following numbered clauses:

Clause 1. A gas turbine engine, comprising: a rotatable drum rotor comprising a plurality of blades secured thereto, the plurality of blades extending radially inward to the rotatable drum rotor; a non-rotatable support casing mounted radially outward of the rotatable drum rotor; a rotor support system comprising a bearing assembly positioned between the rotatable drum rotor and the non-rotatable support casing, the bearing assembly comprising, at least, a stationary support frame and a rotatable race, the rotatable race engaging the rotatable drum rotor at separate and discrete locations that are circumferentially spaced apart around the rotatable drum rotor.

Clause 2. The gas turbine engine of clause 1, wherein the bearing assembly is positioned at one or more axial locations along the rotatable drum rotor.

Clause 3. The gas turbine engine of any of the preceding clauses, wherein the stationary support frame is mounted exterior to or internal of the rotatable drum rotor.

Clause 4. The gas turbine engine of any of the preceding clauses, wherein the rotatable race is defined by a plurality of rotatable roller bearings circumferentially spaced apart about the rotatable rotor drum.

Clause 5. The gas turbine engine of any of the preceding clauses, wherein each of the plurality of roller bearings comprises an inner race, an outer race, and a plurality of rolling elements arranged between the inner and outer races.

Clause 6. The gas turbine engine of any of the preceding clauses, wherein the outer races of the plurality of roller bearings define the rotatable race of the bearing assembly that rotates with the rotatable drum rotor.

Clause 7. The gas turbine engine of any of the preceding clauses, wherein the inner races of each of the plurality of roller bearings are fixed to the stationary support frame such that the inner races do not rotate with the rotatable drum rotor.

Clause 8. The gas turbine engine of any of the preceding clauses, wherein the stationary support frame comprises one or more stationary arm members mounted to the non-rotatable support casing.

Clause 9. The gas turbine engine of any of the preceding clauses, wherein the plurality of rolling elements correspond to at least one of ball rollers or cylindrical rollers.

Clause 10. The gas turbine engine of any of the preceding clauses, wherein the plurality of rolling elements are constructed, at least in part, of ceramic.

Clause 11. The gas turbine engine of any of the preceding clauses, wherein the rotatable drum rotor is part of a compressor section, a turbine section, or a combustion section of the gas turbine engine.

Clause 12. A rotor support system for a gas turbine engine, the gas turbine engine comprising a rotatable drum rotor and a non-rotatable support casing, the rotor support system comprising:
a bearing assembly configured for positioning between the rotatable drum rotor and the non-rotatable support casing, the bearing assembly comprising, at least, a stationary support frame and a rotatable race, the rotatable race configured to engage the rotatable drum rotor at separate and discrete locations that are circumferentially spaced apart around the rotatable drum rotor.

Clause 13. The rotor support system of clause 12, wherein the stationary support frame corresponds to an inner race of the bearing assembly, and wherein the rotatable race corresponds to an outer race of the bearing assembly, the rotatable race being defined by a plurality of rotatable roller bearings circumferentially spaced apart about the rotatable rotor drum.

Clause 14. The rotor support system of clauses 12-13, wherein each of the plurality of roller bearings comprises an inner race, an outer race, and a plurality of rolling elements arranged between the inner and outer races.

Clause 15. The rotor support system of clauses 12-14, wherein the outer races of the plurality of roller bearings define the rotatable race of the bearing assembly that rotates with the rotatable drum rotor.

Clause 16. The rotor support system of clauses 12-15, wherein the inner races of each of the plurality of roller bearings are fixed to the stationary support frame such that the inner races do not rotate with the rotatable drum rotor.

Clause 17. The rotor support system of clauses 12-16, wherein the stationary support frame comprises one or more stationary arm members mounted to the non-rotatable support casing Clause 18. The rotor support system of clauses 12-17, wherein the plurality of rolling elements correspond to at least one of ball rollers or cylindrical rollers.

Clause 19. The rotor support system of clauses 12-18, wherein the plurality of rolling elements are constructed, at least in part, of ceramic.

Clause 20. The rotor support system of clauses 12-19, wherein the rotatable drum rotor is part of a compressor section, a turbine section, or a combustion section of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
a rotatable drum rotor comprising a plurality of blades secured thereto, the plurality of blades extending radially inward from the rotatable drum rotor;
a non-rotatable support casing mounted radially outward of the rotatable drum rotor;
a rotor support system comprising a bearing assembly connected to the the non-rotatable support casing, the bearing assembly comprising, at least, an annular stationary support frame and a rotatable race, the rotatable race comprising a plurality of rotatable roller bearings circumferentially spaced apart about the rotatable rotor drum, each of the plurality of roller bearings comprising an inner race, an outer race, and a plurality of rolling elements arranged between the inner and outer races, wherein the inner race of each of the plurality of roller bearings is fixed to the annular stationary support frame such that the inner races do not rotate with the rotatable drum rotor, the rotatable race engaging the rotatable drum rotor at separate and discrete locations that are circumferentially spaced apart around the rotatable drum rotor.

2. The gas turbine engine of claim 1, wherein the bearing assembly is positioned at one or more axial locations along the rotatable drum rotor.

3. The gas turbine engine of claim 1, wherein the annular stationary support frame is mounted radially exterior to the rotatable drum rotor.

4. The gas turbine engine of claim 1, wherein the annular stationary support frame is mounted radially internal of the rotatable drum rotor.

5. The gas turbine engine of claim 1, wherein the outer races of the plurality of roller bearings define the rotatable race of the bearing assembly that rotates with the rotatable drum rotor.

6. The gas turbine engine of claim 1, wherein the plurality of rolling elements comprises at least one of ball rollers or cylindrical rollers.

7. The gas turbine engine of claim 1, wherein the plurality of rolling elements are constructed, at least in part, of ceramic.

8. The gas turbine engine of claim 1, wherein the rotatable drum rotor is part of a compressor section, a turbine section, or a combustion section of the gas turbine engine.

9. A rotor support system for a gas turbine engine, the gas turbine engine comprising a rotatable drum rotor and a non-rotatable support casing, the rotor support system comprising:
a bearing assembly configured for positioning between the rotatable drum rotor and the non-rotatable support casing, the bearing assembly comprising, at least, an annular stationary support frame and a rotatable race, the rotatable race comprising a plurality of rotatable roller bearings circumferentially spaced apart about the rotatable rotor drum, each of the plurality of roller bearings comprising an inner race, an outer race, and a plurality of rolling elements arranged between the inner and outer races, wherein the inner races of each of the plurality of roller bearings are fixed to the annular stationary support frame such that the inner races do not rotate with the rotatable drum rotor, the rotatable race configured to engage the rotatable drum rotor at separate and discrete locations that are circumferentially spaced apart around the rotatable drum rotor.

10. The rotor support system of claim 9, wherein the annular stationary support frame forms an inner race of the bearing assembly, and wherein the rotatable race is an outer race of the bearing assembly.

11. The rotor support system of claim 9, wherein the outer races of the plurality of roller bearings define the rotatable race of the bearing assembly that rotates with the rotatable drum rotor.

12. The rotor support system of claim 9, wherein the plurality of rolling elements comprise at least one of ball rollers or cylindrical rollers.

13. The rotor support system of claim 9, wherein the plurality of rolling elements are constructed, at least in part, of ceramic.

14. The rotor support system of claim 9, wherein the rotatable drum rotor is part of a compressor section, a turbine section, or a combustion section of the gas turbine engine.

* * * * *